Figure 3:
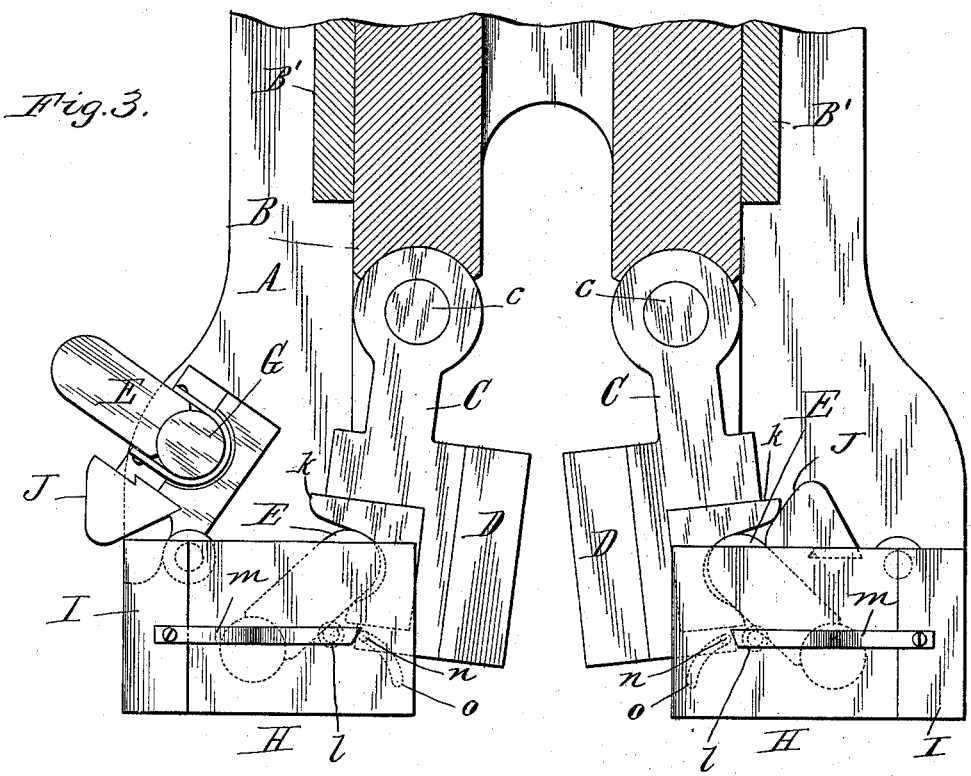

No. 612,557. Patented Oct. 18, 1898.
O. C. BURDICT.
FORGING MACHINE.
(Application filed Nov. 18, 1897.)
(No Model.) 2 Sheets—Sheet 1.
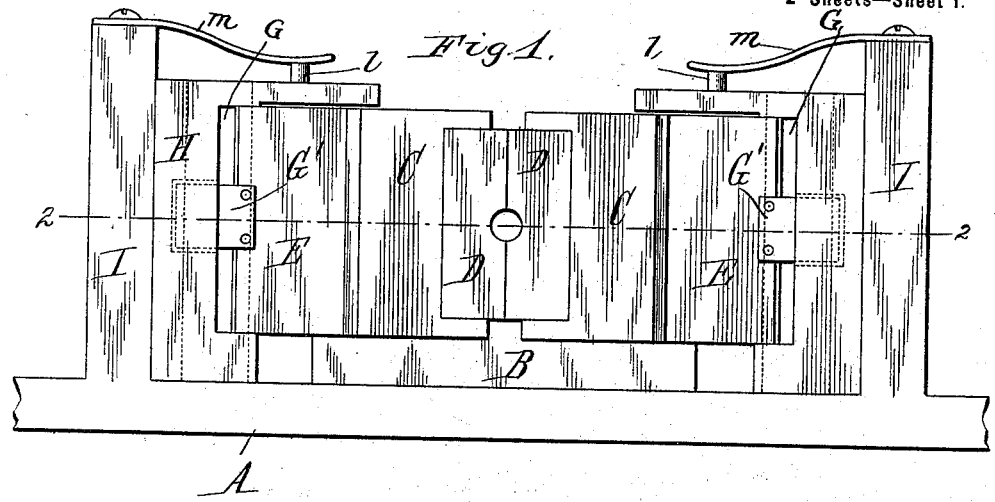
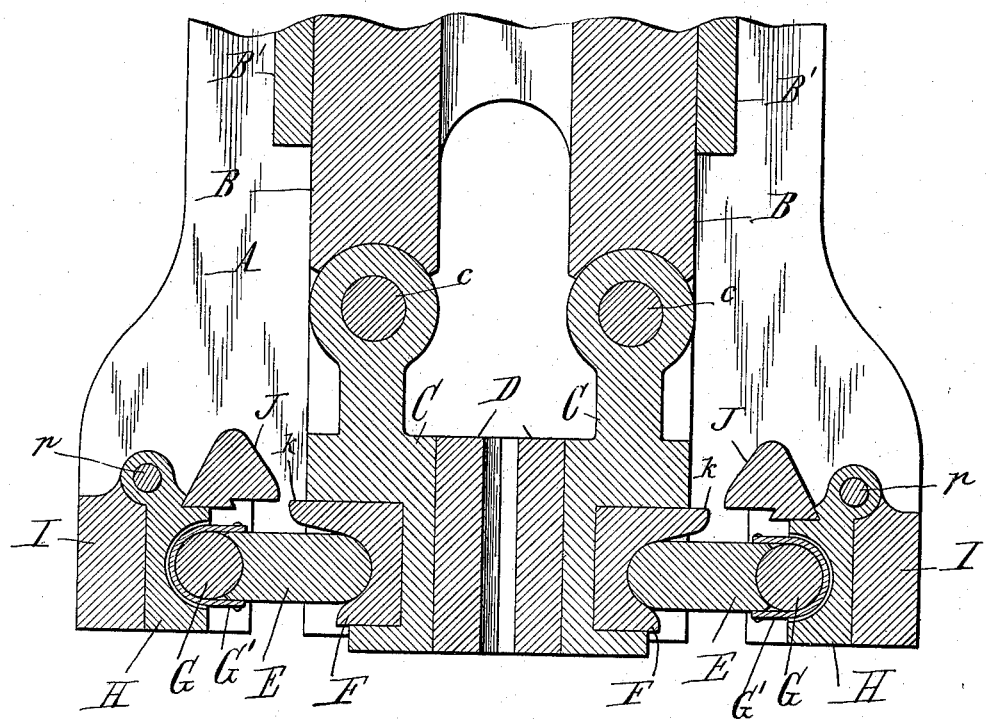
WITNESSES: INVENTOR.
ATTORNEYS.

No. 612,557.  
O. C. BURDICT.  
FORGING MACHINE.  
(Application filed Nov. 18, 1897.)  
(No Model.)  
Patented Oct. 18, 1898.  
2 Sheets—Sheet 2.

WITNESSES:  
Chas. F. Burkhardt  
Henry L. Deck

Orrin C. Burdict  
INVENTOR.  
by Wilhelm Bonner  
ATTORNEYS.

UNITED STATES PATENT OFFICE.

ORRIN C. BURDICT, OF BUFFALO, NEW YORK, ASSIGNOR TO M. E. BURDICT, OF SAME PLACE.

FORGING-MACHINE.

SPECIFICATION forming part of Letters Patent No. 612,557, dated October 18, 1898.

Application filed November 18, 1897. Serial No. 658,892. (No model.)

*To all whom it may concern:*

Be it known that I, ORRIN C. BURDICT, a citizen of the United States, residing at Buffalo, in the county of Erie and State of New York, have invented new and useful Improvements in Forging-Machines, of which the following is a specification.

This invention relates to machines for forging bolts and other headed articles, and more particularly to a forging-machine of the character shown and described in Letters Patent of the United States No. 168,135, granted to me September 28, 1875. In the machine of this patent the blank is automatically seized by a pair of gripping-jaws or holding-dies and presented to a set of reciprocating forging-tools consisting of a longitudinal plunger or holding-tool and a series of transverse tools or hammer-dies which operate upon the blank so as to upset the end of the blank and forge it into a head of the desired form. The gripping devices employed in that machine consist of horizontally-swinging jaws or levers which are pivoted at their rear ends to a reciprocating slide or carriage and which carry hardened-steel dies or gripping-faces, between which the heated blank is held. The jaws are closed by horizontal guide-rollers, which are arranged on opposite sides of the path of the carriage and against which the backs of the jaws bear. In the use of the machine notches or depressions are gradually worn in the back of the jaws by the pressure of the jaws against the guide-rollers, and these depressions allow the pivoted jaws to spread more or less, according to the depth of the depressions, causing the faces of the holding-dies to converge instead of assuming a parallel position, which is necessary in order to forge the neck of the bolt of uniform diameter with its body. The result of this abnormal spread of the jaws is that in upsetting the blank the neck of the bolt is flared or enlarged in accordance with the flaring or tapering space between the holding-dies. The formation of such depressions in the jaws results in the further objection that the shoulders formed by the front edges of the depressions resist the backward movement of the jaws when their carriage is drawn back for releasing the blank, thereby greatly straining the pivots of the jaws and requiring their frequent renewal.

The object of my invention is to provide improved operating devices for the gripping-jaws, whereby the above objections are overcome.

Figure 4:
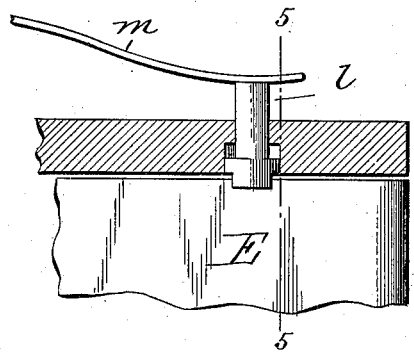
Figure 5:
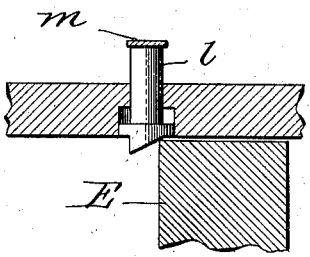

In the accompanying drawings, consisting of two sheets, Figure 1 is a front view of the gripping-jaws, the carriage, and the jaw-closing toggles. Fig. 2 is a horizontal section in line 2 2, Fig. 1. Fig. 3 is a fragmentary top plan view, partly in section, showing one of the gripping-jaws removed and its toggle swung back out of the way and showing the other jaw in its open position. Fig. 4 is a transverse vertical section on an enlarged scale, showing the catch for retaining the toggles in position. Fig. 5 is a vertical section in line 5 5, Fig. 4.

Like letters of reference refer to like parts in the several figures.

A is the bed or stationary frame of the machine, and B the blank carriage or slide supported on the bed and sliding between longitudinal guides or ways B', secured to the bed. The plunger or heading-tool and the lateral tools or hammer-dies and their operating mechanism form no part of my present invention and are not shown in the drawings. Those features may be of any suitable construction—such, for instance, as shown and described in the Letters Patent hereinbefore mentioned, to which reference is made for a full description thereof.

C C represent the horizontally-swinging gripping jaws or levers, which are pivoted at their rear ends to the carriage B by vertical pins c and which carry the holding or gripping dies D, which seize the heated bolt-blank.

E represents horizontally-swinging toggles or levers, whereby the gripping-jaws are automatically closed when the blank-carriage is advanced. These toggles are provided with convex inner ends, which are seated loosely in concave sockets or bearings formed in bushings F, preferably of hardened steel, which latter are arranged on the rear sides of the gripping-jaws near their free ends. The outer ends of the toggles are concave and impinge loosely against upright cylindrical pins or abutments G, which are mounted in vertical boxes or supports H. These boxes abut against the inner sides of uprights or standards I, which rise from the bed A on opposite sides of the carriage-guides B'. The toggles are loosely attached to the pins G by horizontal straps G'. When the blank-carriage is in its retracted position, the toggles are deflected rearwardly, allowing the gripping-jaws to spread or open, while when the carriage is advanced the toggles are straightened or caused to approach a position at right angles to the carriage, thereby swinging the jaws toward each other and automatically closing them, so as to firmly grasp the heated blank placed between the same. The toggles are made of such a length that when they reach a position at right angles to the blank-carriage the jaws are fully closed, as shown in Fig. 2.

J represents upright cams or guides arranged on the rear side of the boxes H and serving to limit the opening movement of the gripping-jaws, so as to prevent the same from swinging beyond their normal position, and also to hold and direct the jaws in the proper relation to the toggles during the initial advance of the jaws. The bushings F of the jaws are provided on their rear portions with outwardly-extending arms or lugs $k$, which ride over the cams or guides J when the jaws are opened, as shown in connection with the right-hand jaw in Fig. 3, thus checking the spread of the jaws. When the jaws are in this open position, the convex ends of the toggles are partly withdrawn from their bearings in the bushings F, as shown, and when the jaws are advanced for closing them the lugs $k$ by their contact with the cams J swing the jaws inwardly until the toggles are fully seated in the bushings of the jaws, when the toggles complete the closure of the jaws.

In order to hold the toggles against displacement when in their rear position, a yielding retaining device is employed for each toggle. The device shown in the drawings consists of a vertically-movable pin or catch $l$, which slides in an opening formed in the overhanging upper portion of the box H. This pin is formed with a beveled or inclined lower end, which is adapted to engage over the front edge of the toggle when the latter is in its rearward position, as shown in Figs. 3, 4, and 5. The pin $l$ is held in its depressed or engaging position by a spring $m$, secured to the upper end of the standard I and bearing with its free end upon the pin. These retaining-pins, while holding the toggles in position with sufficient force to prevent their displacement, yield upwardly and allow the toggles to pass under the same when the toggles are swung forward by the movement of the blank-carriage, the beveled ends of the retaining-pins permitting the same to ride over the upper edge of the toggles.

The jaws may be opened by any suitable means, the automatic means shown in the Letters Patent hereinbefore referred to being satisfactory for this purpose. These consist of a pin $n$, projecting from the upper side of each gripping-jaw and entering a cam-groove $o$, formed in the under side of the overhanging portion of the box H, so that when the blank-carriage is drawn back the cam-groove, acting on the pin $n$, pulls the jaw open and releases the blank.

By the use of the jaw-closing toggles the jaws receive no wear which allows them to spread or deviate from their true position, and the neck of the bolt or other article is therefore forged accurately and of the same diameter as its body. The toggles do not bind against the gripping-jaws, but always swing freely, permitting the blank-carriage to move backward without restraint and relieving the pivots of the gripping-jaws from undue strain or wear.

In order to permit the toggles to be swung backward out of the way, so as to afford more convenient access to the transverse hammer-dies in front of the carriage for changing the same, the boxes H are preferably hinged at their outer rear corners to the standards I by vertical pins $p$, as shown in Figs. 2 and 3, so that the boxes and the toggles carried by the same can be swung rearwardly and outwardly to the position shown in connection with the right-hand jaw in Fig. 3. In order to swing the boxes into this position, the blank-carriage must first be drawn back beyond its normal rearward limit. While this is the preferred construction, the boxes may be permanently secured to the standards I, if desired.

I claim as my invention—

1. The combination with the stationary bed of the machine and the blank-carriage, of laterally-movable gripping jaws or dies mounted on the carriage, abutments arranged on the bed outside of said jaws, and an arm or lever for closing each of said jaws, fulcrumed at its outer end on the adjacent abutment and bearing at its inner end against the jaw, substantially as set forth.

2. The combination with the stationary bed of the machine and the blank-carriage, of swinging gripping jaws or dies pivoted at their rear ends to the blank-carriage, abutments arranged on the bed outside of said jaws, and an arm or lever for closing each of said jaws, fulcrumed at its outer end on the adjacent abutment and bearing at its inner end against the front portion of the jaw, substantially as set forth.

3. The combination with the blank-carriage and the gripping-jaws mounted thereon and provided on their outer sides with sockets or bearings, of abutments arranged on opposite sides of the path of said carriage, and toggle-levers seated loosely against the bearings of the gripping-levers and said abutments, respectively, substantially as set forth.

4. The combination with the stationary frame of the machine and the blank-carriage, of movable gripping-jaws pivoted to the carriage and each provided with a concave bearing in its rear side, cylindrical pins or abutments arranged on the stationary frame, and toggle-levers having convex inner ends impinging against the concave bearings of the gripping-jaws and concave outer ends impinging against said cylindrical pins or abutments, substantially as set forth.

5. The combination with the stationary bed of the machine and the blank-carriage, of movable gripping-jaws mounted on the carriage, arms or levers for closing said jaws, fulcrumed at their outer ends on the bed and bearing at their inner ends loosely against the jaws, and guides arranged on the bed and adapted to be engaged by the jaws for checking the spread of the jaws and maintaining the arms and jaws in the proper relation in the open position of the jaws, substantially as set forth.

6. The combination with the stationary bed of the machine and the blank-carriage, of movable gripping-jaws mounted on the carriage, arms or levers for closing said jaws, fulcrumed at their outer ends on the bed and engaging at their inner ends loosely in bearings formed in the outer sides of said jaws, and forwardly-converging guides arranged on the bed and adapted to engage against the outer sides of the jaws when said arms or levers are not fully seated in said bearings, substantially as set forth.

7. The combination with the stationary bed or frame of the machine and the blank-carriage, of movable gripping-jaws mounted on the carriage and each provided with a bushing having a laterally-extending arm or lug, of toggle-levers bearing at their inner ends against said bushings, and cams or guides mounted on the stationary frame and arranged to bear against the arms or lugs of the gripping-jaws, substantially as set forth.

8. The combination with the stationary bed or frame and the blank-carriage, of gripping-jaws mounted on the carriage, toggle-levers arranged to close said jaws when the carriage is advanced, and a yielding catch or retaining device engaging with each toggle-lever, substantially as set forth.

9. The combination with the stationary bed or frame and the blank-carriage, of the movable gripping-jaws mounted on the carriage, toggle-levers arranged to close said jaws when the carriage is advanced, and horizontally-swinging abutments for said toggle-levers hinged to the bed or frame, substantially as set forth.

Witness my hand this 13th day of November, 1897.

ORRIN C. BURDICT.

Witnesses:
CARL F. GEYER,
E. R. DEAN.